(No Model.)
J. DALTON.
SAFETY HOOK FOR ELECTRIC LIGHTS.
No. 426,778. Patented Apr. 29, 1890.
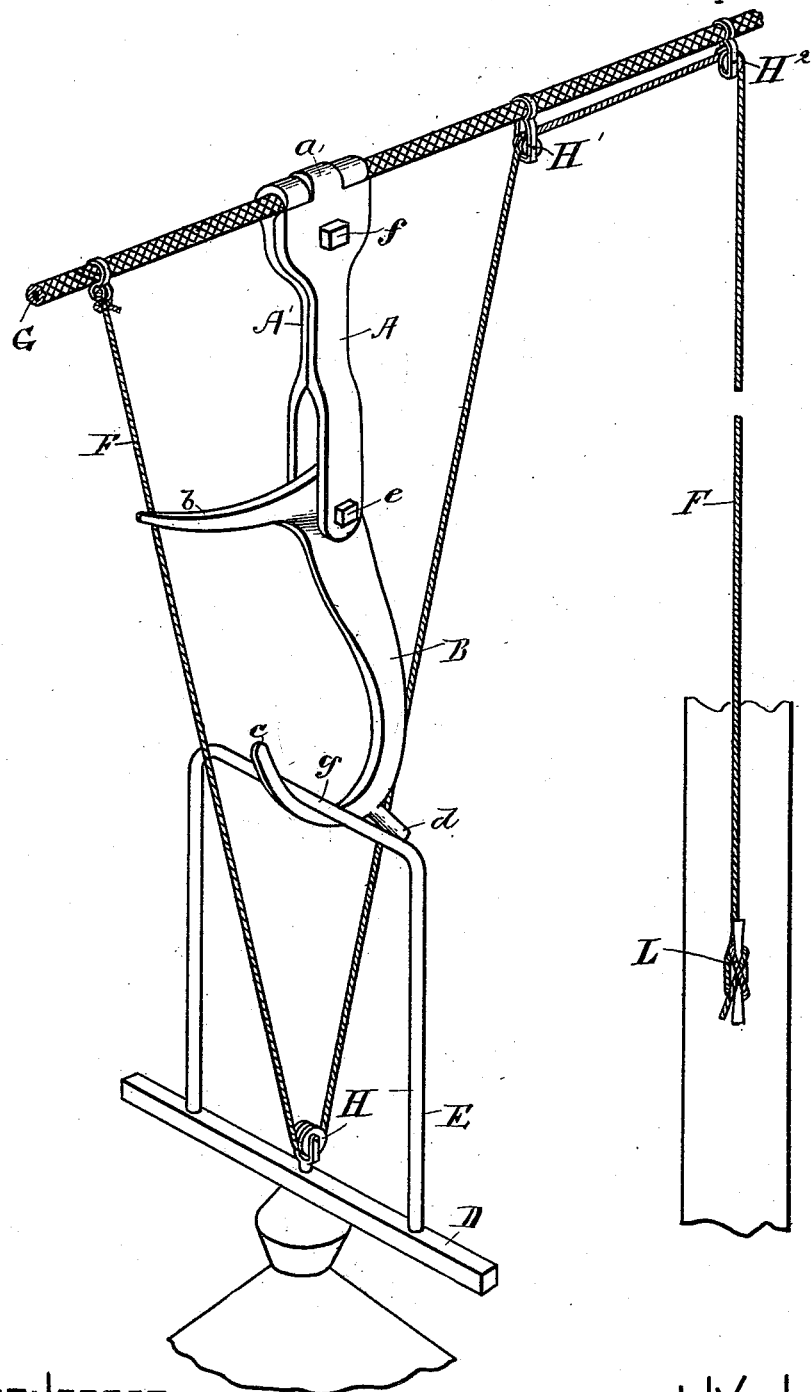
Witnesses.
Albert E. Leach
F. J. Olsson
Inventor.
John Dalton
by W. B. H. Dows
Atty.

UNITED STATES PATENT OFFICE.

JOHN DALTON, OF DANVERS, MASSACHUSETTS, ASSIGNOR TO THEODORE G. LEE, OF SAME PLACE.

SAFETY-HOOK FOR ELECTRIC LIGHTS.

SPECIFICATION forming part of Letters Patent No. 426,778, dated April 29, 1890.

Application filed August 28, 1889. Serial No. 322,174. (No model.)

*To all whom it may concern:*

Be it known that I, JOHN DALTON, a citizen of the United States, residing at Danvers, in the county of Essex and Commonwealth of Massachusetts, have invented a certain new and Improved Safety-Hook for Electric Lights, of which the following is a full specification.

The accompanying drawing shows in perspective the construction and operation of my improved device.

My improved safety device consists of a peculiarly-shaped hook B, pivoted at $e$ to the hanger A A', which is fastened to the supporting-wire G. The hanger A A' is preferably made in two pieces bolted together at $f$, embracing the wire G at $a$, its upper end, and at its lower end embracing the hook B, pivoted thereto. The pulley H has its bearings in the piece D, attached to the top of the lamp, E being a bail arising from the piece D and adapted to engage with the hook B, which thus sustains the weight of the lamp in the manner shown in the drawing.

F is the operating-rope, secured at one end to the wire G, from which the lamp is suspended, passing under the said pulley H, then over one or more pulleys H' $H^2$ on the wire G, and finally secured at L to a place within easy access of the ground.

$b$ is a lifting and depressing lever, preferably integral with the hook B, and $d$ is a stud extending downwardly and rearwardly from the hook B to aid in the hooking of the lamp. The hook is of such a shape that it will naturally hang by gravity in the position shown in the drawing, whether the lamp is or is not hanging thereon, the center of gravity being below the pivot. The hook is intended to bear the weight of the lamp, the rope and pulleys serving simply to lower the lamp when required and to raise it into place again, the operation being as follows:

When it is desired to lower the lamp, a pull of the rope F lifts the bail from off the lower portion of the hook and presses the horizontal portion $g$ against the under curved surface of the lever $b$, lifting the same and swinging the hook B outward on the pivot $e$. The lamp is raised a little farther by pulling the rope F until the bail E passes above the end of the lever $b$, when the hook will drop back by gravity into the position shown in the drawing, but with the horizontal portion $g$ of the bail $e$ above the lever $b$. The lamp is then lowered by slackening the rope F, the horizontal portion $g$ of the bail pressing down the lever $b$ as the lamp descends, and thus swinging the hook B around, so that it will not engage with the bail. When the portion $g$ has slipped by the end of the lever $b$, the hook again swings back into place, the center of gravity being below the pivot, but does not engage with the bail of the lamp, which has then passed below it, and the lamp may then be lowered as far as desired. When the lamp is again raised by pulling the rope F, the part $g$ of the bail presses against the outer end $c$ of the hook B and swings the hook back as the lamp rises; but when it has passed above it the hook again swings into position under the bail, so that when the lamp is lowered a trifle the bail engages with the hook as before.

The rearwardly and downwardly extending part $d$ aids in the hooking up of the lamp. If for any cause the lamp in being raised previous to hooking should swing backward—as, for instance, by reason of a high wind—the bail thereof, if it were not for the part $d$, instead of pressing against the forward or outer end $c$ of the hook B, might pass behind the said hook, and hence fail to engage therewith. The position of the part $d$ is such as to engage with the bail should the lamp swing back, thus swinging back the hook also, so that the bail in rising may press against the part $c$, as before.

With my improved safety device the lamp is held securely in place.

I claim—

1. A safety hanging device for arc lamps, consisting of a hanger, in combination with a hook pivoted thereto having its center of gravity always below its pivot and provided with a lifting and depressing lever $b$, substantially as and for the purposes described.

2. A safety hanging device for arc lamps, consisting of a two-piece hanger A A', having the wire-embracing portion $a$, in combination with a hook B, pivoted to said hanger, having its center of gravity always below its pivot and provided with a lifting and depressing lever $b$, integral with the hook, arranged and operating substantially as and for the purposes described.

3. The combination, with an arc lamp provided with a bail, of a raising and lowering rope and pulleys and a single stationarily-pivoted hook having its center of gravity always below the pivot and provided with a lifting and depressing lever $b$, arranged and operating substantially as and for the purposes described.

4. In a safety hanging device for arc lamps, a stationarily-pivoted hook B, having its center of gravity below the pivot and provided with the lifting and depressing lever $b$ and the downwardly and rearwardly extending stud $d$, substantially as and for the purposes described.

In witness whereof I have hereunto set my hand.

JOHN DALTON.

Witnesses:
WM. B. H. DOWSE,
ALBERT E. LEACH.